United States Patent
Munshi et al.

(10) Patent No.: US 10,180,825 B2
(45) Date of Patent: Jan. 15, 2019

(54) SYSTEM AND METHOD FOR USING UBERSHADER VARIANTS WITHOUT PREPROCESSING MACROS

(71) Applicant: Apple Inc., Cupertino, CA (US)

(72) Inventors: Aaftab A. Munshi, Los Gatos, CA (US); Charles Brissart, Cupertino, CA (US); Owen Anderson, Cupertino, CA (US); Mon Ping Wang, Sunnyvale, CA (US); Ravi Ramaseshan, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 108 days.

(21) Appl. No.: 15/244,668

(22) Filed: Aug. 23, 2016

(65) Prior Publication Data

US 2017/0090886 A1 Mar. 30, 2017

Related U.S. Application Data

(60) Provisional application No. 62/235,502, filed on Sep. 30, 2015.

(51) Int. Cl.
*G06F 9/44* (2018.01)
*G06F 8/41* (2018.01)
(Continued)

(52) U.S. Cl.
CPC .............. *G06F 8/41* (2013.01); *G06F 8/423* (2013.01); *G06F 8/52* (2013.01); *G06F 9/4552* (2013.01); *G06T 1/20* (2013.01)

(58) Field of Classification Search
None
See application file for complete search history.

(56) References Cited

U.S. PATENT DOCUMENTS 8,189,004 B2 * 5/2012 Kilpatrick ............... G06T 15/80
345/426
8,276,129 B1 * 9/2012 Kiel ......................... G06F 8/71
345/501

(Continued)

OTHER PUBLICATIONS

Elrom, Elad, Scott Janousek, and Thomas Joos. "Adobe Integrated Runtime on Mobile Devices." Advanced Flash on Devices: Mobile Development with Flash Lite and Flash 10 (2009): 329-382. (Year: 2009).*

(Continued)

*Primary Examiner* — Matthew J Brophy
(74) *Attorney, Agent, or Firm* — Blank Rome LLP (57) ABSTRACT

Ubershaders may be used in a graphics development environment as an efficiency tool because many options and properties may be captured in a single shader program. Each selectable option of property in the shader code may be tagged with an attribute to indicate the presence of the selection. The single shader program embodying the many selectable options and properties may be compiled to an intermediate version that also embodies the many options and properties, along with at least remnants of the tagging attributes. Upon a request for executable code including indications of the desired selectable options or properties, generation of the executable code may proceed such that it includes only the desire selectable options and properties and not other selectable options and properties embodied in the source code.

20 Claims, 6 Drawing Sheets

(51) Int. Cl.
   *G06T 1/20*     (2006.01)
   *G06F 8/52*     (2018.01)
   *G06F 9/455*    (2018.01)

(56) References Cited

U.S. PATENT DOCUMENTS

| | | | | |
|---|---|---|---|---|
| 8,296,738 | B1* | 10/2012 | Kiel | G06F 11/3624 |
| | | | | 717/125 |
| 8,510,724 | B2* | 8/2013 | Levanoni | G06F 8/53 |
| | | | | 717/136 |
| 8,640,097 | B2* | 1/2014 | Khouzam | H04N 21/4143 |
| | | | | 717/107 |
| 8,806,458 | B2* | 8/2014 | Glaister | G06F 8/453 |
| | | | | 717/146 |
| 9,740,464 | B2* | 8/2017 | Munshi | G06F 8/47 |
| 9,799,094 | B1* | 10/2017 | Chen | G06T 1/60 |
| 2010/0277488 | A1* | 11/2010 | Myers | G06T 15/40 |
| | | | | 345/581 |
| 2011/0154307 | A1* | 6/2011 | Upton | G06T 11/40 |
| | | | | 717/146 |
| 2011/0177775 | A1* | 7/2011 | Gupta | H04H 20/93 |
| | | | | 455/3.06 |
| 2011/0202947 | A1* | 8/2011 | Gupta | H04N 21/26266 |
| | | | | 725/14 |
| 2011/0314458 | A1* | 12/2011 | Zhu | G06F 8/314 |
| | | | | 717/149 |
| 2012/0159458 | A1* | 6/2012 | Levanoni | G06F 8/51 |
| | | | | 717/136 |
| 2013/0215117 | A1* | 8/2013 | Glaister | G06F 8/456 |
| | | | | 345/426 |
| 2013/0219377 | A1* | 8/2013 | Glaister | G06F 8/433 |
| | | | | 717/146 |
| 2013/0219378 | A1* | 8/2013 | Glaister | G06F 8/453 |
| | | | | 717/146 |
| 2013/0271465 | A1* | 10/2013 | Clarberg | G06T 15/80 |
| | | | | 345/426 |
| 2013/0339928 | A1* | 12/2013 | Trofin | G06F 9/44521 |
| | | | | 717/122 |
| 2015/0347107 | A1* | 12/2015 | Munshi | G06F 8/47 |
| | | | | 717/147 |
| 2016/0054998 | A1* | 2/2016 | Du | G06F 9/30098 |
| | | | | 345/522 |
| 2017/0090886 | A1* | 3/2017 | Munshi | G06F 8/41 |
| 2017/0308364 | A1* | 10/2017 | Munshi | G06F 8/47 |

OTHER PUBLICATIONS

Rhodin,H. (2010). A ptx code generator for llvm. URL: ftp://ftp.heanet.ie/mirrors/sourceforge/l/project/ll/llvmptxbackend/Rhodin_PTXBachelorThesis.pdf. (Year: 2010).*

Trapp, Matthias, and Jürgen Döllner. "Automated Combination of Real-Time Shader Programs." Eurographics (Short Papers). 2007. (Year: 2007).*

Helge Rhodin, "A PTX Code Generator for LLVM," Oct. 29, 2010 (Oct. 29, 2010), pp. 1-63, XP055208570, Saarbrucken, Germany, Retrieved from the Internet: URL: http://compilers.cs.uni-saarland.de/publications/theses/rhodin_bsc.pdf [retrieved on Aug. 19, 2015].

* cited by examiner

| 370 APPLICATION A | 371 PHOTO | 372 Finance | 373 MOVIE | 374 APPLICATION B | } 375 |
|---|---|---|---|---|---|
| 360 OTHER APPLICATION SERVICES | 361 SPRITE KIT | 362 SCENE KIT | 363 CORE ANIMATION | 364 CORE GRAPHICS | } 380 |
| 350 O/S SERVICES | 351 OPENGL | 352 METAL | 353 SOFTWARE RAYTRACER | 354 SOFTWARE RASTERIZER | } 385 |
| O/S KERNEL 345 | | | | | } 390 |
| HARDWARE 340 | | | | | } 395 |

FIG. 6

SYSTEM AND METHOD FOR USING UBERSHADER VARIANTS WITHOUT PREPROCESSING MACROS

BACKGROUND

This application claims priority to and depends upon Provisional Application No. 62/235,502, filed on Sep. 30, 2015 and entitled, "System and Method for Using Ubershader Variants Without Preprocessing Macros," such Provisional Application being hereby incorporated by reference in its entirety.

The inventions disclosed herein relate to the field of graphics processing and, without limitation, systems and methods that include the development and use of ubershaders and variants thereof without the use of pre-processing macros.

Graphics processing units (GPUs) have become important for processing data-parallel graphics tasks. Developers now recognize that non-graphics data-parallel tasks can also be handled by GPUs, taking advantage of their massive parallel capabilities. Vendors and standards organizations have created application programming interfaces (APIs) that make graphics data-parallel tasks easier to program because of the high level of developer programming interaction. There are also low-level APIs (or libraries/frameworks etc.) that reside closer to hardware and are generally employed by applying the output of the higher-level APIs. In other words, the higher-level APIs generally simply prepare program code for application to the lower-level APIs.

GPUs commonly use programs called shader programs or shaders. One common example of a shader, is a program that operates on a pixel of graphics (or the computational equivalent). One way to write shaders is to code selectable features or properties in the code, so that different executable programs may be derived from the same shader source code. This type of shader program is commonly called an ubershader. Ubershaders are convenient because they allow many programing options to be implemented all in one shader. However, the art relating to Ubershaders may be improved.

SUMMARY

Many embodiments of the disclosure relate to the use of software with graphics processing units (GPUs), for creating graphics services or compute services. In a graphics development environment, programmers may use ubershaders as an efficiency tool so that many options and properties may be captured in a single shader program. The existence of many options means that the ubershader may be compiled into many executable code versions—at least one version for each permutation of option in the source code. In order to facilitate the efficient creations of many variants based upon a single ubershader, some embodiments of the invention propose the insertion of option indicator attributes in the ubershader source code to flag the availability of options in the code. Upon compiling for execution, the options may be exercised with reference to a library, dictionary or other source so that only the necessary code is converted to executable and so that the correct option choices are reflected in that code.

DETAILED DESCRIPTION

This disclosure pertains to systems, methods, and computer readable media to improve the operation of graphics development systems and graphics systems. It also pertains to a variety of architectures for design and/or operation of a graphics development system and the rendering of related graphics on an end user device. In general, many embodiments of the invention envision the use of ubershaders as shader source code produced in a text editor or in a development system.

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed concepts. In the interest of clarity, not all features of an actual implementation are described. Moreover, the language used in this disclosure has been principally selected for readability and instructional purposes, and may not have been selected to delineate or circumscribe the inventive subject matter, leaving resorting to the claims as a potential necessity to determine such inventive subject matter. Reference in this disclosure to "one embodiment" or to "an embodiment" or "embodiments" means that a particular feature, structure, or characteristic described in connection with the embodiment is included in at least one embodiment of the disclosed subject matter, and multiple references to "one embodiment" or "an embodiment" should not be understood as necessarily all referring to the same embodiment. In addition, the use of the word "or" in this disclosure is intended to indicate an optional alternative and not an exclusive alternative, unless the exclusivity is specifically noted.

It will be appreciated that in the development of any actual implementation (as in any software and/or hardware development project), numerous decisions must be made to achieve the developers' specific goals (e.g., compliance with system- and business-related constraints), and that these goals may vary from one implementation to another. It will also be appreciated that such development efforts might be complex and time-consuming, but would nonetheless be a routine undertaking for those having the benefit of this disclosure and being of ordinary skill in the design and implementation of user interface and response systems and/or gesture identification processing systems.

Exemplary Hardware And Software

The inventive embodiments described herein may have implication and use in and with respect to all types of devices, including single- and multi-processor computing systems and vertical devices (e.g., cameras, gaming systems, appliances, etc.) that incorporate single- or multi-processing computing systems. The discussion herein is made with reference to a common computing configuration that may be discussed as a software development system or an end user system. This common computing configuration may have a CPU resource including one or more microprocessors. This discussion is only for illustration regarding sample embodiments and is not intended to confine the application of the invention to the disclosed hardware. Other systems having other known or common hardware configurations (now or in the future) are fully contemplated and expected. With that caveat, a typical hardware and software operating environment is discussed below. The hardware configuration may be found, for example, in a server, a workstation, a laptop, a tablet, a desktop computer, a gaming platform (whether or not portable), a television, an entertainment system, a smart phone, a phone, or any other computing device, whether mobile or stationary.

Figure 1:
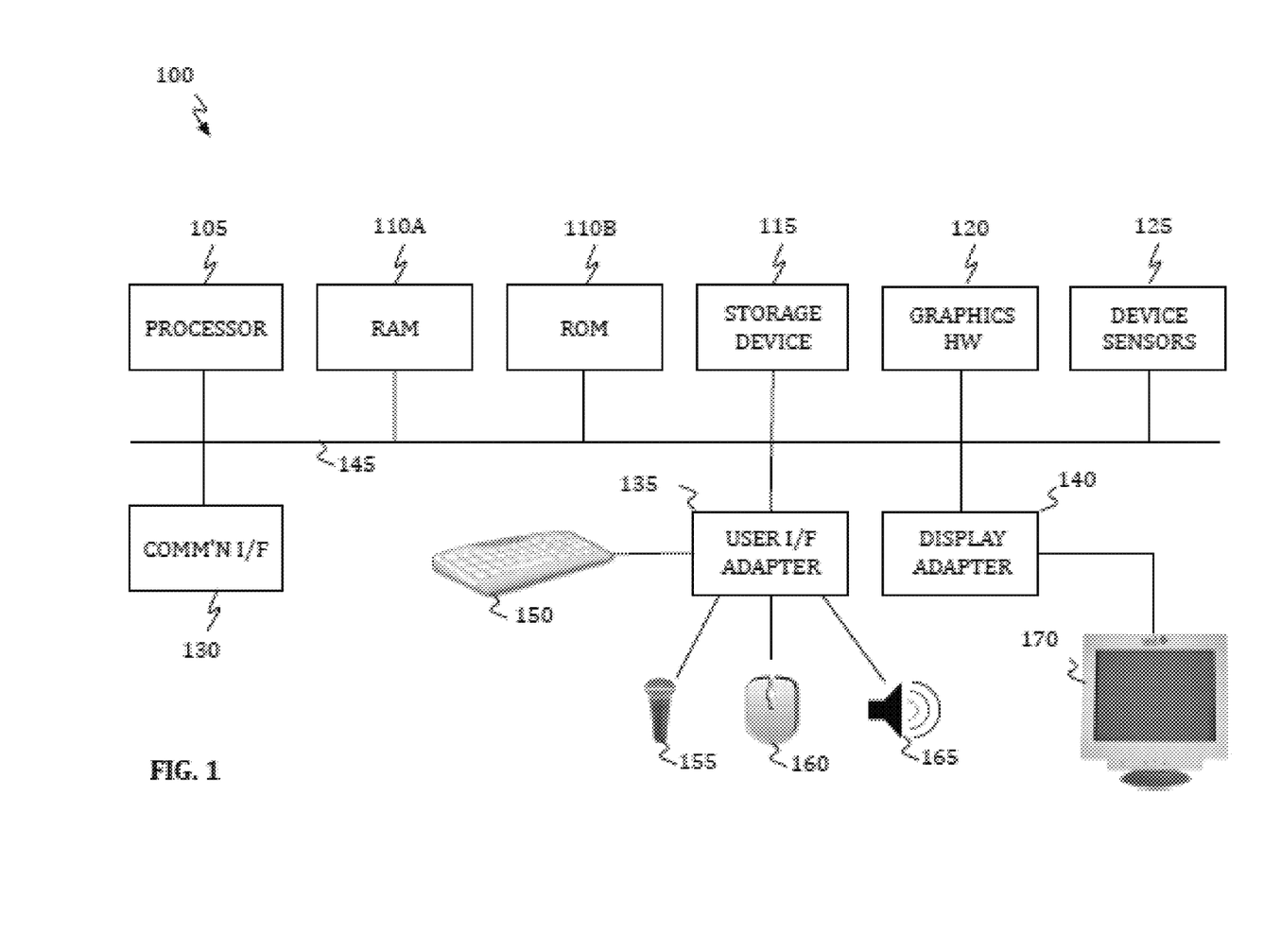
FIG. 1 shows a representative computer node that may be used, for example, as an end-user machine or a developer machine.

Referring to FIG. 1, the disclosed embodiments may be performed by representative computer system 100. For example the representative computer system may act as a software development platform or an end-user device. System 100 may be embodied in any type of device such as a general purpose computer system, a television, a set top box, a media player, a multi-media entertainment system, an image processing workstation, a hand-held device, or any device that may be coupled with or may incorporate display or presentation devices as discussed herein. Computer system 100 may include one or more processors 105, memory 110 (110A and 110B), one or more storage devices 115, and graphics hardware 120, that may include one or more GPUs. Computer system 100 may also have device sensors 125, which may include one or more of: depth sensors (such as a depth camera), 3D depth sensor(s), imaging devices (such as a fixed and/or video-capable image capture unit), RGB sensors, proximity sensors, ambient light sensors, accelerometers, gyroscopes, any type of still or video camera, LIDAR devices, SONAR devices, microphones, CCDs (or other image sensors), infrared sensors, thermometers, etc. These and other sensors may work in combination with one or more GPUs, DSPs or conventional microprocessors along with appropriate programming so the sensor outputs may be properly interpreted and/or combined and interpreted.

Returning to FIG. 1, system 100 may also include communication interface 130, user interface adapter 135, and display adapter 140—all of which may be coupled via system bus or backplane 145. Memory 110 may include one or more different types of media (e.g., solid-state, DRAM, optical, magnetic, etc.) used by processor 105 and graphics hardware 120. For example, memory 110 may include memory cache, read-only memory (ROM), and/or random access memory (RAM). Storage 115 may include one or more non-transitory storage media including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 110 and storage 115 may be used to retain media (e.g., audio, image, and video files), preference information, device profile information, computer program instructions organized into one or more modules and written in any desired computer programming language, and any other suitable data. When executed by processor 105 and/or graphics hardware 120, such computer program code may implement one or more of the methods or processes described herein. Communication interface 130 may include semiconductor-based circuits and be used to connect computer system 100 to one or more networks. Illustrative networks include, but are not limited to: a local network, such as a USB network; a business's local area network; and a wide area network such as the Internet and may use any suitable technology (e.g., wired or wireless). Communications technologies that may be implemented include cell-based communications (e.g., LTE, CDMA, GSM, HSDPA, etc.) or other communications (Ethernet, WiFi, Bluetooth, USB, Thunderbolt, Firewire, etc.). User interface adapter 135 may be used to connect keyboard 150, microphone 155, pointer device 160, speaker 165, and other user interface devices such as a touchpad and/or a touch screen (not shown). Display adapter 140 may be used to connect one or more display units 170.

Processor 105 may execute instructions necessary to carry out or control the operation of many functions performed by system 100 (e.g., evaluation, transformation, and compilation of graphics programs). Processor 105 may, for instance, drive display 170 and receive user input from user interface adapter 135 or any other user interfaces embodied by a system. User interface 135, for example, can take a variety of forms, such as a button, a keypad, a dial, a click wheel, a keyboard, a display screen, and/or a touch screen. Processor 105 may be any type of computing device such as one or more microprocessors working alone or in combination with one or more GPUs, DSPs, system-on-chip devices such as those found in some mobile devices. Processor 105 may include one or more dedicated GPUs or graphics subsystems that accept program instructions to create or alter display information such as pixels. In addition, processor 105 may be based on reduced instruction-set computer (RISC) or complex instruction-set computer (CISC) architectures or any other suitable architecture and may include one or more processing cores. Graphics hardware 120 may be special purpose computational hardware for processing graphics and/or assisting processor 105 in performing computational tasks. In some embodiments, graphics hardware 120 may include CPU-integrated graphics and/or one or more programmable GPUs, which may be operated in serial or parallel cooperation. System 100 (implementing one or more embodiments discussed herein) can provide the means for one or more users to control the same system (e.g., system 100) or another system (e.g., another computer or entertainment system) through user activity, which may include natural activity and/or predetermined gestures such as hand gestures.

Output from the sensors 125 may be processed, at least in part, by processors 105 and/or graphics hardware 120, and/or a dedicated image processing unit incorporated within or without system 100. Information so captured may be stored in memory 110 and/or storage 115 and/or any storage accessible on an attached network. Memory 110 may include one or more different types of media used by processor 105, graphics hardware 120, and sensors 125 to perform device functions. Storage 115 may store data such as media (e.g., audio, image, and video files); metadata for media; computer program instructions; and other software; including database applications (e.g., a database storing avatar frames), preference information, device profile information, and any other suitable data. Memory 110 and storage 115 may be used to retain computer program instructions or code organized into one or more modules in either compiled form or written in any desired computer programming language. When executed by, for example, processor 105 or one or more GPUs in the system, such computer program code may implement one or more of the acts or functions described herein (e.g., compiling shader code, generating executable code or executing executable code).

Figure 2:
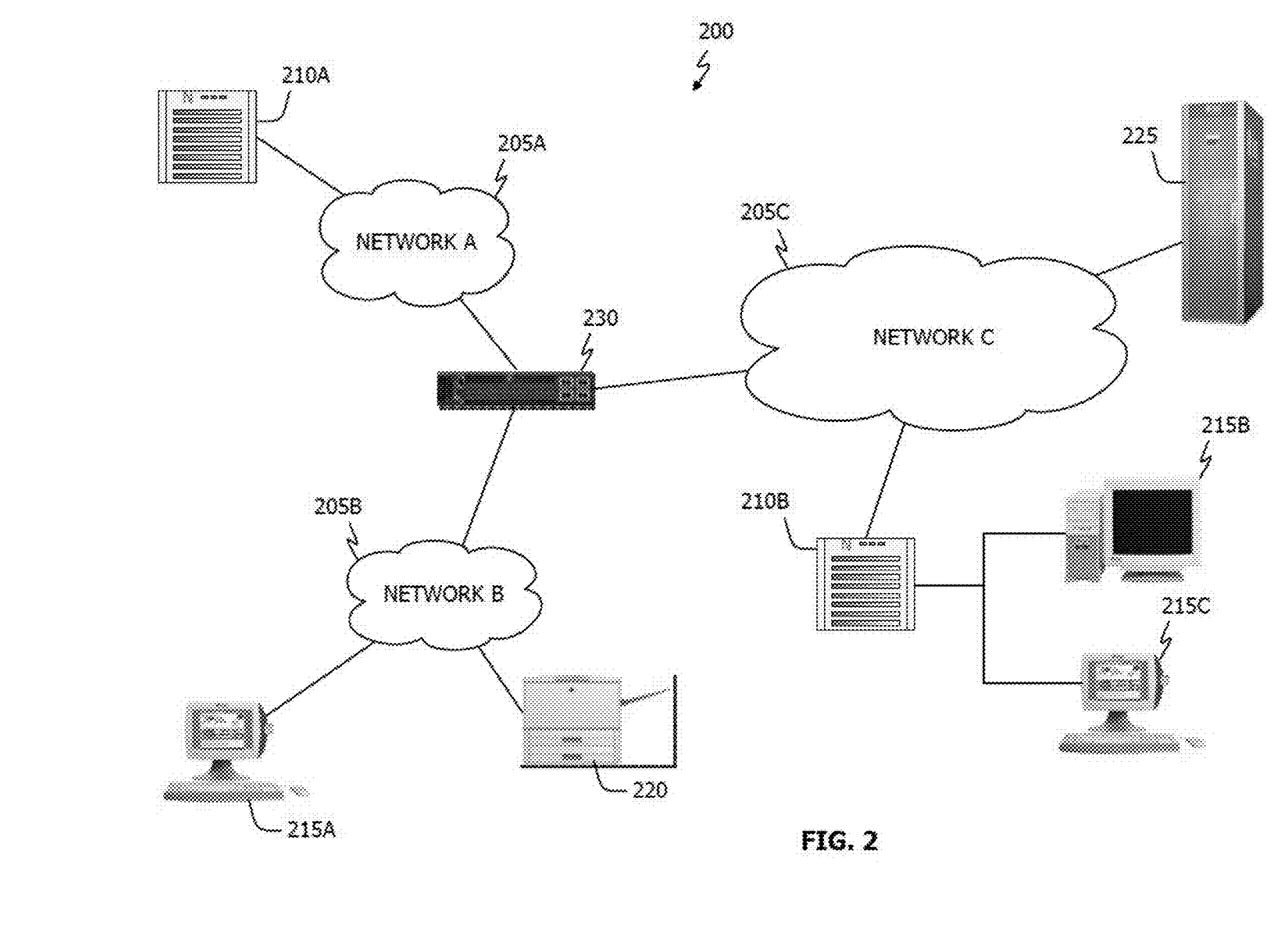
FIG. 2 shows an illustrative network environment associated with embodiments of the invention.

FIG. 2 depicts illustrative network architecture 200, within which the disclosed techniques may be implemented and the disclosed hardware may reside. This illustrative network 200 may include a plurality of networks 205, (i.e., 205A, 205B, and 205C), each of which may take any form including, but not limited to, a local area network (LAN) or a wide area network (WAN), such as the Internet. Further, networks 205 may use any desired technology (wired, wireless, or a combination thereof) and protocol (e.g., transmission control protocol, TCP). Coupled to networks 205 are data server computers 210 (i.e., 210A and 210B) that are capable of operating server applications such as databases and also capable of communicating over networks 205. One embodiment using server computers may involve the operation of one or more central systems to process graphics information and distribute the processed information to nodes on a network.

Client computers 215 (i.e., 215A, 215B, and 215C), which may take the form of any smartphone, gaming system, tablet, computer, set top box, entertainment device/system, television, telephone, communications device, or intelligent machine, including embedded systems, may also be coupled to networks 205, and/or data server computers 210. In some embodiments, network architecture 210 may also include network printers such as printer 220 and storage systems such as 225, which may be used to store multimedia items or other data that are referenced herein. To facilitate communication between different network devices (e.g., data servers 210, end-user computers 215, network printer 220, and storage system 225), at least one gateway or router 230 may be optionally coupled therebetween. Furthermore, in order to facilitate such communication, each device employing the network may comprise a network adapter circuit and related software. For example, if an Ethernet network is desired for communication, each participating device must have an Ethernet adapter or embedded Ethernet-capable ICs. Further, the devices may carry network adapters for any network in which they might participate (including, but not limited to, PANs, LANs, WANs, and cellular networks).

As noted above, embodiments of the inventions disclosed herein include software. As such, a description of common computing software architecture is provided as expressed in a layer diagram in FIG. 3. Like the hardware examples, the software architecture discussed here is not intended to be exclusive in any way, but rather to be illustrative. This is especially true for layer-type diagrams, which software developers tend to express in somewhat differing ways. In this case, the description begins with layers starting with the base hardware layer 395 illustrating hardware, which may include CPUs and GPUs or other processing and/or computer hardware. Above the hardware layer is the O/S kernel layer 390 showing an example as O/S kernel 345, which is kernel software that may perform memory management, device management, and system calls (often the purview of hardware drivers). The notation employed here is generally intended to imply that software elements shown in a layer use resources from the layers below and provide services to layers above. However, in practice, all components of a particular software element may not behave entirely in that manner.

Returning to FIG. 3, layer 385 is the O/S services layer exemplified by O/S services 350. O/S services may provide core O/S functions in a protected environment. In addition, O/S services shown in layer 385 may include frameworks for OpenGL 351, Metal 352, Software Raytracer 353, and a Pure Software Rasterizer 354. These particular examples all relate to graphics and/or graphics libraries and are chosen to illuminate the topic of many embodiments herein, which relate to graphics handling. These particular examples also represent graphics frameworks/libraries that may operate in the lower tier of frameworks, such that developers may use shading and graphics primitives and/or obtain fairly tightly coupled control over the graphics hardware. In addition, the particular examples named in FIG. 3 may also pass their work product on to hardware or hardware drivers.

Referring again to FIG. 3, OpenGL 351 represents an example of a well-known library and application-programming interface for graphics rendering including 2D and 3D graphics. Metal 352 also represents a published graphics library and framework, but it is lower level than OpenGL 351, supporting fine-grained, low-level control of the organization, processing, and submission of graphics and computation commands, as well as the management of associated data and resources for those commands. Software Raytracer 353 is software for creating image information based upon the process of tracing the path of light through pixels in the plane of an image. Pure Software Rasterizer 354 refers generally to software used to make graphics information such as pixels without specialized graphics hardware (e.g., using only the CPU). These libraries or frameworks shown within the O/S services layer 385 are only exemplary and intended to show the general level of the layer and how it relates to other software in a sample arrangement (e.g. kernel operations usually below and higher-level Applications Services 360 usually above). In addition, it may be useful to note that Metal 352 represents a published framework/library of Apple Inc. that is known to developers in the art. Furthermore, OpenGL 351 may represent a framework/libary present in versions of software either currently or formerly distributed by Apple Inc.

Figure 3:
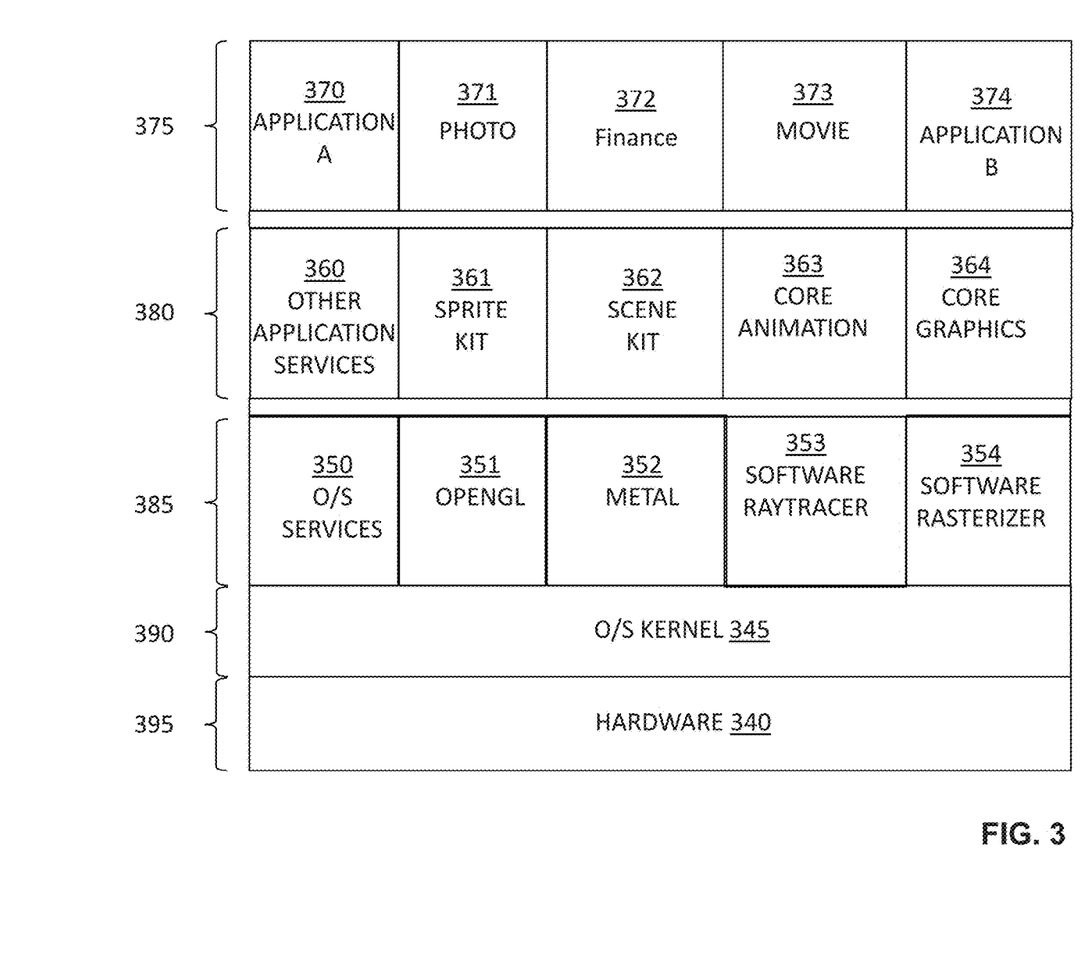
FIG. 3 shows an illustrative software layer and architecture diagram.

Above the O/S services layer 385 there is an Application Services layer 380, which includes Sprite Kit 361, Scene Kit 362 Core Animation 363, and Core Graphics 364. The O/S services layer represents higher-level frameworks that are commonly directly accessed by application programs. In some embodiments of this disclosure the O/S services layer includes graphics-related frameworks that are high level in that they are agnostic to the underlying graphics libraries (such as those discussed with respect to layer 385). In such embodiments, these higher-level graphics frameworks are meant to provide developer access to graphics functionality in a more user/developer friendly way and allow developers to avoid work with shading and graphics primitives. By way of example, Sprite Kit 361 is a graphics rendering and animation infrastructure made available by Apple Inc. Sprite Kit 361 may be used to animate textured images or "sprites." Scene Kit 362 is a 3D-rendering framework from Apple Inc. that supports the import, manipulation, and rendering of 3D assets at a higher level than frameworks having similar capabilities, such as OpenGL. Core Animation 363 is a graphics rendering and animation infrastructure made available from Apple Inc. Core Animation 363 may be used to animate views and other visual elements of an application. Core Graphics 364 is a two-dimensional drawing engine from Apple Inc. Core Graphics 365 provides 2D rendering for applications.

Above the application services layer 380, there is the application layer 375, which may comprise any type of application program. By way of example, FIG. 3 shows three specific applications: Photo Application 371 (a photo management, editing, and sharing program), Finance Program 372 (a financial management program), and Movie Application 373 (a movie making and sharing program). Application layer 375 also shows two generic applications 370 and 374, which represent the presence of any other applications that may interact with or be part of the inventive embodiments disclosed herein. Generally, embodiments of the invention employ and/or interact with applications that produce displayable/viewable content. Regarding embodiments of the disclosure, text editors and software development environments to create shader source code generally operate in the application layer, but may also have lower level components. Compilers and executable code generators may also operate in the application layer, but in some embodiment may operate as a service to Applications and therefore reside in a lower level either exclusively or in addition to presence in the application layer.

In evaluating O/S services layer 385 and applications services layer 380, it may be useful to realize that different frameworks have higher- or lower-level application program interfaces, even if the frameworks are represented in the same layer of the FIG. 3 diagram. The illustration of FIG. 3 serves to provide a general guideline and to introduce exemplary frameworks that may be discussed later. Furthermore, some embodiments of the invention may imply that frameworks in layer 380 make use of the libraries represented in layer 385. Thus, FIG. 3 provides intellectual reinforcement for these examples. Importantly, FIG. 3 is not intended to limit the types of frameworks or libraries that may be used in any particular way or in any particular embodiment.

Ubershaders Programming Paradighm

Figure 4:
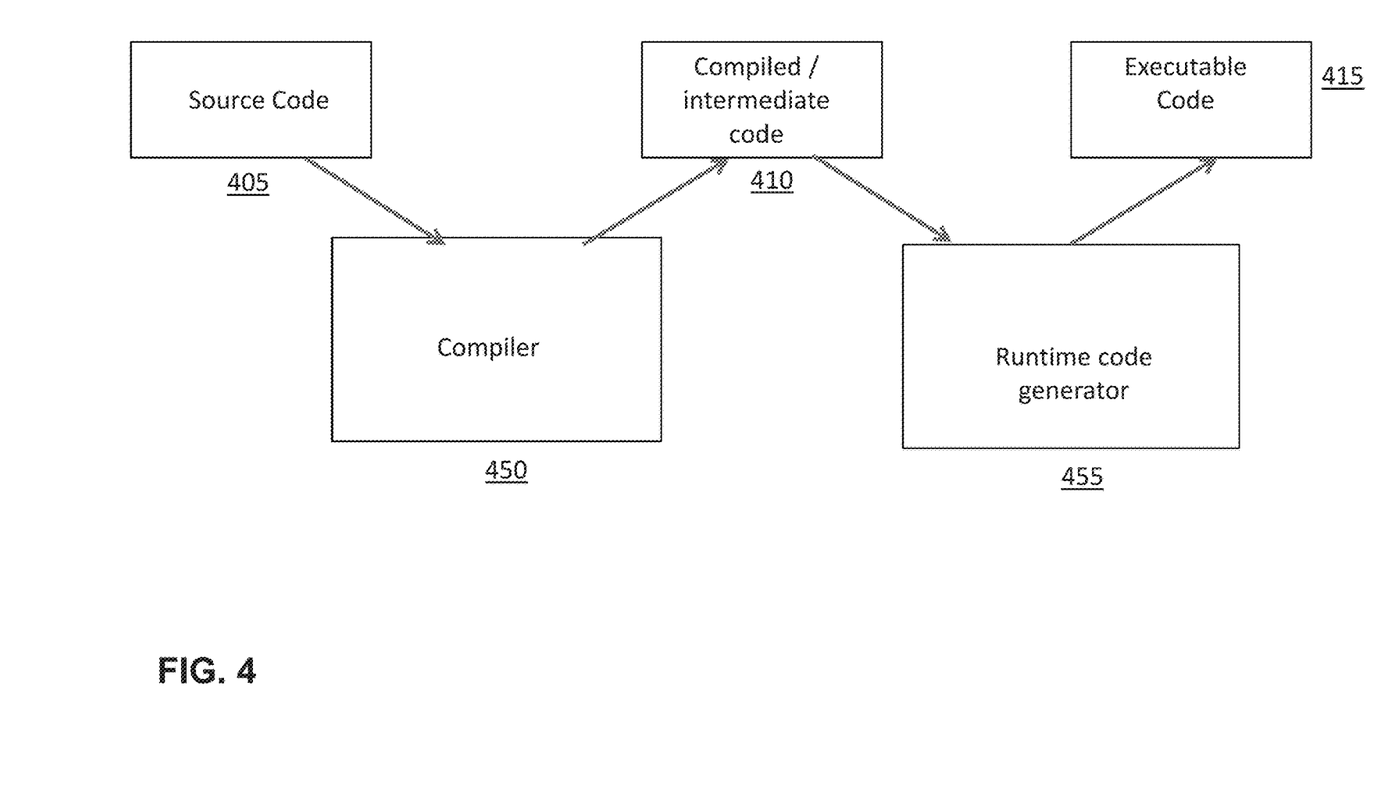
FIG. 4 shows illustrative system and process architectures.

Many embodiments of the disclosure relate to the use of software with graphics processing units (GPUs), for creating graphics services or compute services. Referring to FIG. 4, shaders or fragment programs are often generated for submission to a GPU in the manner shown. Source code 405 for a shader may be developed on a developer computer system, which can be any capable computer system, including an end user system or a server. Prior to installation on an end-user device, the shaders are typically compiled using a compiler program 450, which yields compiled code 410. A relatively common practice in the graphics art is for the compiled code 410 to be an intermediate type of compiled code that may not yet be executable on the GPU. In some embodiments, this compiled/intermediate code may be pre-installed on an end-user device as part of the operating system or a pre-installed application. In other embodiments, this compiled/intermediate code 410 may be installed on an end-user device as part of an application install or software upgrade to the operating system or any application. At runtime, when the function or service underlying the compiled/intermediate code 410 is needed, a runtime code generator 455 provides the executable code 415 to be submitted to a GPU for execution.

In many instances, shader source code 405 may be written by developers to encompass multiple code paths, which can be enabled or disabled. For example, in some embodiments, each code path represents a selectable or optional property or feature of the shader. In specific examples, shading languages such as GLSL, HLSL or GPGPU languages (e.g. CUDA), may use preprocessor macros to describe and distill these features for a compiler so that compiled shader code may be generated for a number of discrete feature sets. Thus, in these examples, a developer produces specific shader variants for each discrete selection of features/properties expressed in the shader source code 405. Each variant is generated by compiling the shader source code 405 with appropriate pre-processor macros.

An example of the foregoing may be found in typical programming procedures, such as those used for compilation using Apple's Metal shaders. Typically, Metal shaders are compiled offline by adding Metal shader source files to a development project (e.g., an Apple Xcode project). The developer package (e.g., Xcode) compiles the shader source using a compiler tool (e.g., the metal command-line tool), to produce binaries that the application can load later (e.g., using APIs from the MTLLibrary class). It is also possible to compile at runtime (e.g., "online") by using a different compiler tool or APIs in the same tool (e.g., MTLLibrary APIs). However, when an offline compiler is employed, options or option flags may be set to control preprocessing. For example, when offline compiling with Apple's Metal, option flags may be set to control preprocessor behavior, choose math functions in the standard library, and request other options. In addition, when using an online compiler (e.g., Metal compiler), options (although perhaps a subset of the offline options) may be used through different programming resources (e.g., for Apple systems, using the MTLCompileOptions class). In either event, the options may be selected for compiling and may be exercised during the compiling operation.

Some example options may include, preprocessor options, math intrinsic options, options for controlling language versions, and options to suppress warnings. Preprocessor Options control the preprocessor (e.g., a macro or the Apple Metal preprocessor) that may be run on each shader source file before compilation. While varying embodiments may offer different functionality, one relevant feature of the preprocessor macros is to allow the programmer to change which features of a shader are enabled or disabled in the intermediate code or the executable code.

Using Ubershaders

Figure 5:
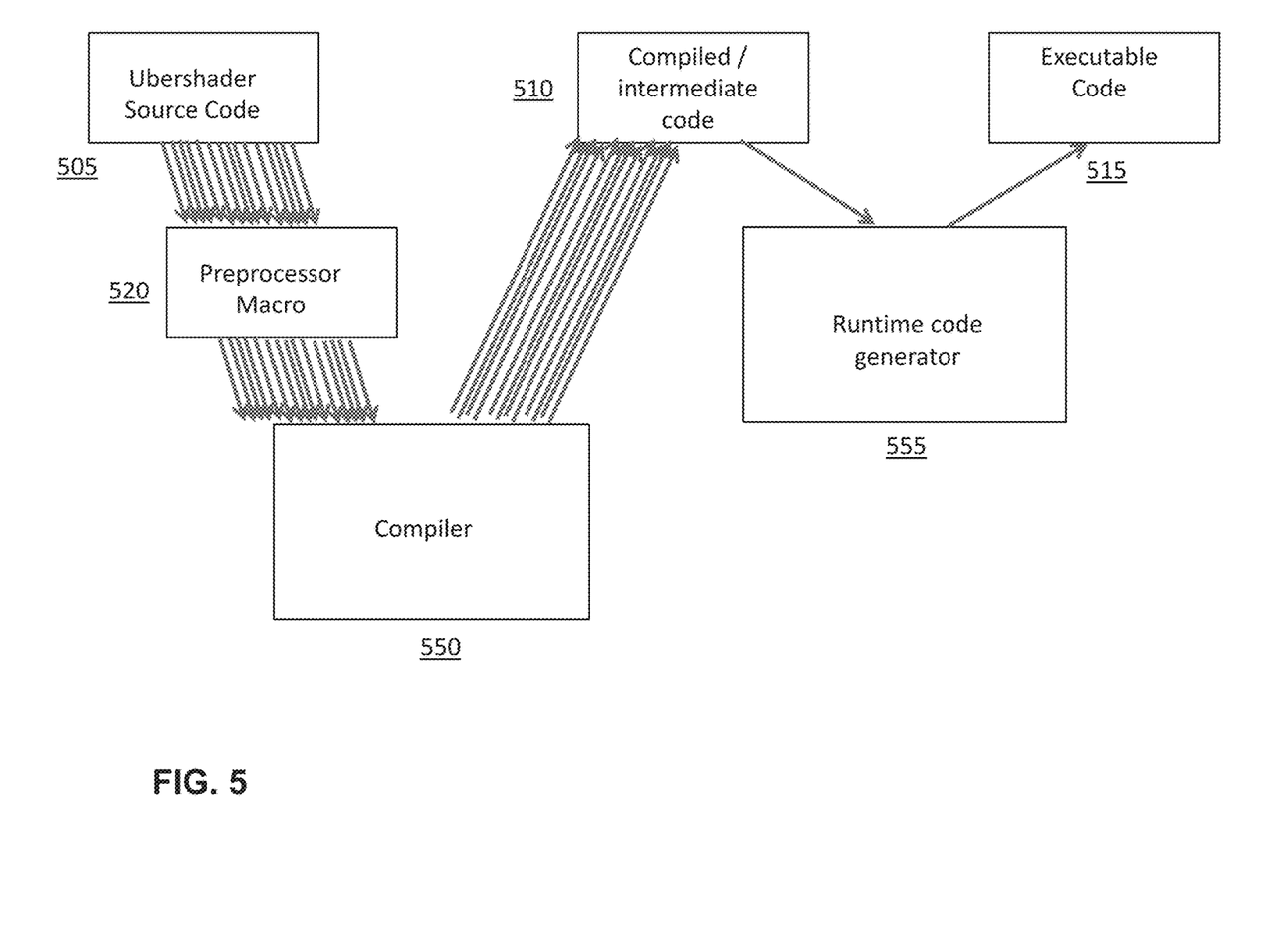
FIG. 5 shows a second illustrative system and process architecture.

Referring now to FIG. 5, an illustrated example is shown. Source code 505 is indicated as ubershader code to refer to a shader with different code paths, e.g., many different features/properties that may, for example (and in some embodiments), be selected through options in the code. As shown in FIG. 5, each variant of the property/feature set may be selected and distilled through a pre-processor macro 520, and, as indicated by the many arrows between ubershader source code 505 and preprocessor macro 520, the macros 520 may be applied many times to create separate variants for submission to the compiler. For example, a preprocessor macro 520 may be run on or in the shader 505 to create an executable or intermediate representation that provides a specific set of options (i.e., enabled or disabled features of the shader 505) selected by the macro. In some embodiments, the preprocessor macros are coded into the ubershader, for example as #ifdefs. In other embodiments, once features/properties are distilled into one or more variants by the preprocessor macro 520, each variant may be submitted to the compiler 550 in order to produce compiled/intermediate code for each variant. As shown in FIG. 5, by the many arrows, the number of variants separately represented in compiled/intermediate code 510 may be extremely numerous. Thus, in order to access all the feature variations of the ubershader 505, many different compilation cycles must be exercised, creating many versions/variants of the executable or intermediate version (i.e., one for each permutation of options settings). This can create very large asset files that are may be inconvenient or undesirably large for transport, installation and/or use on the end-user device.

Using Ubershaders Without Preprocessing Macros

Varying embodiments of the disclosure involve generating or compiling ubershaders without using pre-processor macros. For example, with reference to FIG. 6, an ubershader 605 is shader source code having one or more (but typically many) selectable features and/or properties. In some embodiments, the shader source code 605 may be augmented with indications ("option-indicators") in the code flagging each variable and/or selectable/optional feature that the developer would like to have exercisable on the end-user device. The source code may be compiled by compiler 650, which may understand the meaning of the option-indicators and may pass through either the meaning of the option indicator or the actual option indicator into the compiled/intermediate code 610. For example, an option indicator flag may be placed in the shader source code at locations where features or properties may be exercised or not. In some embodiments, the compiled code 610 contains the option indicators from the shader source code 605 or a version of the option indicators that conveys the meaning of the available option.

Figure 6:
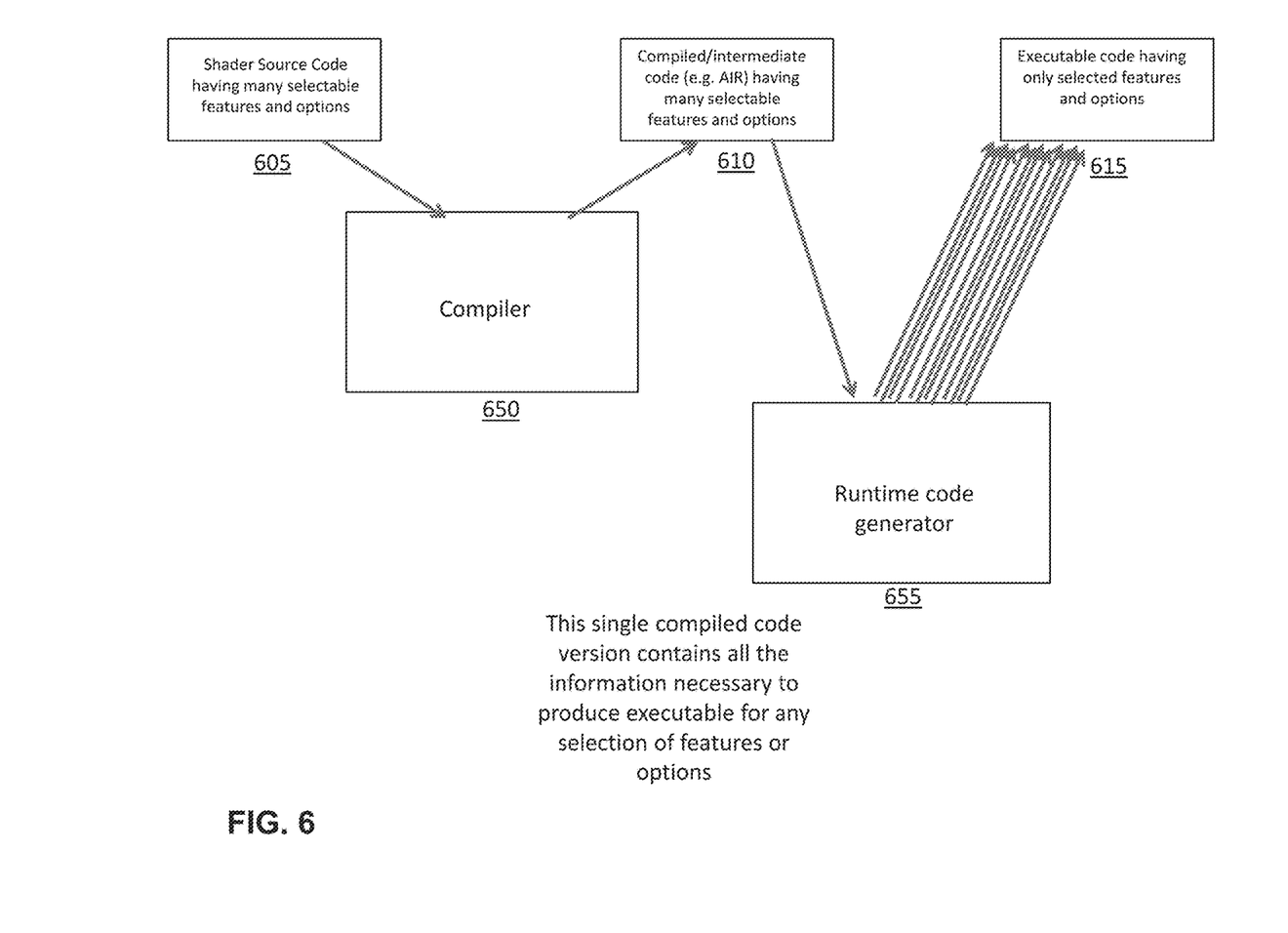
FIG. 6 shows a third illustrative system and process architecture.

In some embodiments, the compiled/intermediate code is loaded on the end user device and may be converted to executable code 615 at runtime or before (e.g., when an application starts). Notably, in many embodiments, the compiled intermediate code 610 reflects all the options/features available from the shader source code 605. In other embodiments, some of the options may be intentionally eliminated for any conceivable reason, such as the capabilities of the end-user software or hardware. In any case, one or more embodiments may use a run time code generator 655 to create executable GPU code. In some embodiments, the timing of the creation of the executable code 615 is based upon the behavior of the related application program. For example, the executable code may be created just in time for use or at the start of the application or any application module. The code generator 655 may be a compiler or other software adapted to convert the compiled/intermediate code 610 to suitable executables for the target GPU.

As shown by the arrows in FIG. 6, the compiled/intermediate code 610 may yield, through the runtime code generator, many different versions of executable code 615. Each version or variant may express differing selections of options from the shader source code 605. Thus, by using certain embodiments of the invention, there is no need to ship or store thousands of assets for each ubershader or multi-featured shader.

Implementation

As noted above, many embodiments of the disclosure provide for using ubershaders without preprocessing macros. In some embodiments, this result may be implemented by providing option indicators in the shader source code. As discussed above, the option indicators flag points in the code related to the optional features of the shader. In one or more embodiments, the option indicators or a representation thereof are carried through to a compiled version of the code (such as an intermediate version). Furthermore, in some embodiments, when the compiled/intermediate code is invoked on the end-user device, the invocation may include a designation regarding the option-indicators that are to be exercised. In other words, the designation indicates which features of the shader are enabled or disabled. In this way, any set of options available from the shader source code 605 may be invoked at runtime through designation or manipulation of the option indicators (or a derivative thereof). In one particular example related to Apple's Metal framework, the options are exercised or invoked when the .air code is converted to executable code.

In one or more embodiments of the invention, offline compiling (through for example compiler 650) occurs only once. In these embodiments, all the features offered by the source code remain present in the compiled/intermediate code (e.g. 610) and may be enabled or disabled at the time of creating the executables. Some embodiments of the disclosure also provide a tool that allows selection of the options/features to be enabled in the executable code. The tool may be a developer tool that provides this ability to a programmer, through programming on the end user device, which may include conditional programming.

Constant Attribute

In some embodiments of the disclosure, an ubershader attribute may be employed as an option indicator. For example, when a constant or variable is declared in the shader source code, the constant or variable may be tagged with an ubershader attribute and any desired additional information. In some embodiments, in order to facilitate the use of option indicators, such as an ubershader attribute, the shader language may be extended to include these items. For example, Apple's Metal shading language may be extended to allow program scope variables declared in constant address space with an attribute that identifies them as an ubershader attribute. In some embodiments, the ubershader attribute does not require initialization in the shader source code. In one or more embodiments, the ubershader attribute may instead be initialized later, for example, at the time of creating the render or compute pipeline state. Furthermore, note the use of "expression" in the sample atttibute above, shows that an ubershader attribute may specify expressions, such as Boolean expressions of constants/variables declared in program scope.

The following shows examples of ubershader attributes intended for use with Apple Metal, but extendable to any shader context:

[1] constant int a;
[2] constant bool b;
[3] constant int c;

Referring to lines [1] and [2] above, there is shown that the variables "a" and "b" are given ubershader attributes. In some embodiments, the value of ubershader variables "a" and "b" are specified when the render or compute pipeline state is created. As is evident for line [3] above, in one or more embodiments, the value of ubershader variable "c" may be computed based on the value of ubershader variables "a" and "b." In some embodiments, the constant types may include int, bool and float. For reference: "bool" indicates a conditional data type, and in some embodiments one that has the value of either true or false, where the value true expands to the integer constant 1, and the value false expands to the integer constant 0; int indicates an integer and in some embodiments a signed two's complement 32 bit integer; and float indicates a floating point, including, in some embodiments, a 32-bit floating-point, where the float data type must conform to the IEEE 754 single-precision storage format.

As discussed above, in some embodiments, when the shader source code is compiled, the ubershader attributes are noted in the compiled/intermediate code (e.g., Apple AIR). Thus, in one or more embodiments, when the executable code is created, values for the constants or variables (e.g., "a," "b," and "c" in the example above) in the ubershader attributes may be inserted in the option indicator expressions (e.g., in AIR) to access or produce the correct executable code.

By way of example, the following table shows preprocessing macro statements juxtaposed to ubershader attribute statements that are used in some embodiments of the disclosure. The final example shows the context of surrounding code:

| Macro | Ubershader attribute |
|---|---|
| | Initial declarations:<br>constant bool realtime_shadow [[ uber_shader_constant ]];<br>constant bool med_quality [[ uber_shader_constant ]];<br>constant bool high_quality [[ uber_shader_constant ]];<br>constant bool postprocess [[ uber_shader_constant ]]; |
| #ifdef REALTIME_SHADOW<br>...<br>#endif | if (realtime_shadow) |
| #ifdef MED_QUALITY | if (med_quality) |
| #ifdef HIGH_QUALITY<br>...<br>    #endif<br>#endif | if (high_quality) |
| #ifdef POSTPROCESS<br>// Depth Of Field<br>vOut.V_DepthOfFieldCOC = half((vOut.Position.z −globalUniform->DepthOfFieldVS.x) * globalUniform->DepthOfFieldVS.y);<br>#endif | if (postprocess)<br>{<br>// Depth Of Field vOut.V_DepthOfFieldCOC = half((vOut.Position.z − globalUniform->DepthOfFieldVS.x) * globalUniform->DepthOfFieldVS.y);return vOut;<br>} |

In one or more embodiments, ubershader constants declared with attribute can only be a scalar or vector type, and in some of those embodiments, can only be supported by Metal. In these embodiments, the use of a user-defined type or an array of a scalar or vector type with the attribute will create a compilation error.

As another example, in the table below, there are juxtaposed a macro-based statement for the declaration of arguments with an analogous statement using one embodiment of the disclosure.

| Macro-based declaration | Declaration based upon one embodiment |
|---|---|
| fragment half4 LightmapPhongLUT_PSMain(<br>  constant GlobalUniformData *globalUniform [[ buffer(0) ]],<br>  constant RenderUniformData_ModelWithLightmap *renderUniform [[ buffer(1) ]],<br>constant MaterialUniformData *materialUniform [[ buffer(2) ]],<br>texture2d<float> PM_DiffuseTexture [[ texture(0) ]],<br>texture2d<float> LightmapTexture [[ texture(1) ]],<br>texture2d<float> FogTexture [[ texture(3) ]],<br>#ifdef MED_QUALITY<br>    texture2d<float> PM_LookupTexture [[ texture(4) ]],<br>#endif<br>#ifdef REALTIME_SHADOW<br>    texture2d<float> RealtimeShadowMapTexture [[ texture(10) ]],<br>#endif<br>    sampler PM_DiffuseTextureSampler [[ sampler(0) ]],<br>    sampler LightmapTextureSampler [[ sampler(1) ]],<br>    sampler FogTextureSampler [[ sampler(3) ]],<br>#ifdef MED_QUALITY<br>    sampler PM_LookupTextureSampler [[ sampler(4) ]],<br>#endif<br>#ifdef REALTIME_SHADOW<br>    sampler RealtimeShadowMapTextureSampler [[ sampler(10) ]],<br>#endif<br>  VertexOutput fragIn [[ stage_in ]]) | constant bool realtime_shadow [[ uber_shader_constant ]];<br>constant bool med_quality [[ uber_shader_constant ]];<br>fragment half4 LightmapPhongLUT_PSMain(<br>constant GlobalUniformData *globalUniform [[ buffer(0) ]],<br>constant RenderUniformData_ModelWithLightmap *renderUniform [[ buffer(1) ]],constant MaterialUniformData *materialUniform [[ buffer(2) ]],<br>texture2d<float> PM_DiffuseTexture [[ texture(0) ]],<br>texture2d<float> LightmapTexture [[ texture(1) ]],<br>texture2d<float> FogTexture [[ texture(3) ]],<br>texture2d<float> PM_LookupTexture [[ texture(4), uber_shader_constant(med_quality) ]],<br>texture2d<float> RealtimeShadowMapTexture [[ texture(10), uber_shader_constant(realtime_shadow) ]],<br>sampler PM_DiffuseTextureSampler [[ sampler(0) ]],<br>sampler LightmapTextureSampler [[ sampler(1) ]],<br>sampler FogTextureSampler [[ sampler(3) ]],<br>sampler PM_LookupTextureSampler [[ sampler(4), uber_shader_constant(med_quality) ]],<br>sampler RealtimeShadowMapTextureSampler [[ sampler(10), uber_shader_constant(realtime_shadow) ]],<br>VertexOutput fragIn [[ stage_in ]]) |

As illustrated, in some embodiments, arguments to a shader can be declared with the attribute qualifier to identify that the argument is optional and is associated with a Boolean ubershader expression (identified by expression). If expression is true (e.g., determined when compiling from intermediate code, such as AIR, to device executable code), the argument is defined. In these embodiments, if expression is false, the argument is not defined, so using the argument inside the shader will result in a compile-time error.

As yet another example, in the table below, there are juxtaposed a preprocessor macro-based struct with an analogous struct using one embodiment of the disclosure.

| Macro-based struct | Struct based upon one embodiment |
|---|---|
| struct VertexOutput {<br>  float4 Position [[ position ]];<br>  half2 V_Texcoord;<br>  half2 V_TexcoordLightmap;<br>  half2 V_FogLookup;<br>#ifdef REALTIME_SHADOW<br>  half4 V_RealtimeShadowMapTexcoord;<br>#endif<br>#ifdef MED_QUALITY<br>  half2 V_Lookup;<br>#ifdef HIGH_QUALITY<br>  half3 V_DiffuseColor;<br>#endif<br>#endif<br>#ifdef POSTPROCESS<br>  half V_DepthOfFieldCOC;<br>#endif<br>}; | constant bool realtime_shadow [[ uber_shader_constant ]];<br>constant bool med_quality [[ uber_shader_constant ]];<br>constant bool high_quality [[ uber_shader_constant ]];<br>constant bool postprocess [[ uber_shader_constant ]];<br>struct VertexOutput {<br>  float4 Position [[ position ]];<br>  half2 V_Texcoord;<br>  half2 V_TexcoordLightmap;<br>  half2 V_FogLookup;<br>  half4_V_RealtimeShadowMapTexcoord<br>  [[uber_shader_constant(realtime_shadow) ]];<br>  half2 V_Lookup [[ uber_shader_constant(med_quality) ]];<br>  half3 V_DiffuseColor [[uber_shader_constant(high_quality)<br>]];<br>  half V_DepthOfFieldCOC<br>  [[uber_shader_constant(postprocess) ]];<br>}; |

In some embodiments, elements of a struct can be declared with the attribute qualifier to identify that the argument is optional and is associated with a boolean uber-shader expression, identified by expression. In one or more embodiments, if expression is true (determined when compiling from an intermediate representation, such as Apple AIR, to device executable code), the element is defined. In these embodiments, if expression is false, the element is not defined, so using the argument inside the shader will result in a compile-time error.

API—Populating Variables

As discussed above, in some embodiments of the disclosure, the constants (or variables) or option indicators (e.g., ubershader attributes) are populated and or resolved at or near the time that the executable code is produced. In one or more embodiments, a library or dictionary may be employed, whereby the library or dictionary may be referenced to recover the value of variables or constants to be populated prior to resolving the attribute and either prior to or during the generation of executable code. In some embodiments relating to Apple Metal, the values of each constant may be set on the pipeline descriptor for the executable code generator, so the code generator may be able to generate the final program. In one particular embodiment, a method is used to query a constant dictionary function called MTLFunctionConstantDictionary as follows:

```
@interface MTLFunctionConstantDictionary : NSObject
- (id)objectForKeyedSubscript:(id <NSCopying>)key;
- (void)setObject:(id)obj forKeyedSubscript:(id <NSCopying>)key;
@end
@interface MTLRenderPipelineDescriptor : NSObject <NSCopying>
...
@property (readonly, nonatomic)
MTLFunctionConstantDictionary *functionConstants;
@end
```

The following shows sample code:

```
descriptor.functionConstants[@"propertyName"]=
    [NSNumber numberWithInt:10];
```

In some embodiments, the variables or constants can also be queries through reflection on the MTLFunction. The MTLFunction may represent a given constant exported by the function with its name and type. In one or more embodiments, only a limited number of types are supported (MTLDataTypeBool, MTLDataTypeInt, MTLDataTypeFloat, MTLDataTypeUInt):

```
@interface MTLFunctionConstant : NSObject
@property (readonly) NSString *name;
@property (readonly) MTLDataType type;
@end
```

One example of an array containing the list of all the constants exported by a given function can be queried as follows:

```
typedef NS_OPTIONS(NSUInteger, MTLFunctionReflectionOption)
{
    MTLFunctionReflectionOptionNone        = 0
    ...
    MTLFunctionReflectionOptionConstants   = 1<<3,
};
@interface MTLFunctionReflection : NSObject
@property (readonly) NSArray *constants;
// array of MTLFunctionConstant
@end
@protocol MTLFunction <NSObject>
(void)              functionReflectionWithOptions:
(MTLFunctionReflectionOptions)options completionHandler:(void (/\)
(MTLFunctionReflection *reflection)completionHandler;
```

For reference, in the embodiments and examples above referencing MTLFunction, it represents a shader or compute function. For example, an MTLFunction object may represent a single function that is written in the Metal shading language and executed on the GPU as part of a graphics or compute pipeline. More details on the Metal shading language may be found in Apple's Metal Shading Language Guide. In certain embodiments, to pass data or state between the Metal runtime and a graphics or compute function written in the Metal shading language, an assignment must be made of an argument index for textures, buffers, and samplers. The argument index identifies which texture, buffer, or sampler is being referenced by both the Metal runtime and Metal shading code. For a rendering pass, the code may specify a MTLFunction object for use as a vertex or fragment shader in a MTLRenderPipelineDescriptor object (or similar object), as discussed in the appendices or in the referenced Apple guides. For a compute pass, the code may specify a MTLFunction object when creating a MTL-ComputePipelineState object (or similar object) for a target device, as discussed in the appendices or in the referenced Apple guides.

Implementation Upon Prior Systems

One or more of the embodiments described herein may be conceived as altered versions of graphics development environments and frameworks that are currently commonly known. With reference to FIG. 4, the compiler 450 may be altered to receive, understand, and process option indicators. In the Apple Metal paradigm, this is analogous to making alterations to CLANG. Furthermore, the runtime code generator may be altered to allow specification of constants and to convert the intermediary to executable code while taking account of the values for variables and/or constants that indicate features of the source code that will be present in the executable code.

It is to be understood that the above description is intended to be illustrative, and not restrictive. The material has been presented to enable any person skilled in the art to make and use the invention as claimed and is provided in the context of particular embodiments, variations of which will be readily apparent to those skilled in the art (e.g., many of the disclosed embodiments may be used in combination with each other). In addition, it will be understood that some of the operations identified herein may be performed in different orders. The scope of the invention, therefore, should be determined with reference to the appended claims, along with the full scope of equivalents to which such claims are entitled. In the appended claims, the terms "including" and "in which" are used as the plain-English equivalents of the respective terms "comprising" and "wherein."

To aid the reader's understanding of details relating to this discussion, a four part appendix follows. Section A of the appendix shows a sample API embodiment for use in association with the concepts discussed herein. Section B of the appendix shows implementation information and sample code for implementing one or more of the embodiments discussed herein. Section C shows sample embodiment information represented as a draft version of Section 4.9 of the Metal Shading Language Guide, published by Apple Inc. Finally, Section D shows an illustrative API Description for use in association with the embodiments discussed herein.

The invention claimed is:

1. A method comprising:
generating an intermediate representation of a shader source code module, wherein the intermediate representation comprises intermediate code;
wherein the shader source code module comprises a plurality of option indicators, each option indicator indicating a place in the shader source code module corresponding to enabling or disabling one of a plurality of features embodied in the shader source code module, and wherein the intermediate representation comprises a compiled version of the shader source code module, which includes a compiled option indicator corresponding to each of the plurality of option indicators in the shader source code module;
receiving an indication to produce executable code for a GPU, wherein the executable code includes a first plurality of features expressed in the shader source code module and the executable code does not include a second plurality of features expressed in the shader source code module; and
generating the executable code from the intermediate representation.

2. The method of claim 1, wherein the intermediate representation is an .air file.

3. The method of claim 1, wherein the indication to produce executable code is a runtime request for the executable code.

4. The method of claim 1, wherein the indication to produce executable code is an application module starting.

5. The method of claim 1, wherein an option indicator comprises an attribute including a conditional expression.

6. The method of claim 1, further comprising:
querying a data resource to discover variable or constant values required to generate the executable code.

7. The method of claim 1, wherein generating the executable code comprises compiling the intermediate representation.

8. A non-transitory program storage device, readable by a processor and comprising instructions stored thereon to cause one or more processors to:
generate an intermediate representation of a shader source code module, wherein the intermediate representation comprises intermediate code;
wherein the shader source code module comprises a plurality of option indicators, each option indicator indicating a place in the shader source code module corresponding to enabling or disabling one of a plurality of features embodied in the shader source code module, and wherein the intermediate representation comprises a complied version of the shader source code module, which includes a compiled option indicator corresponding to each of the plurality of option indicators in the shader source code module;
receive an indication to produce executable code for a GPU, wherein the executable code includes a first plurality of features expressed in the shader source code module and the executable code does not include a second plurality of features expressed in the shader source code module; and
generate the executable code from the intermediate representation.

9. The non-transitory program storage device of claim 8, wherein the indication to produce executable code is a runtime request for the executable code.

10. The non-transitory program storage device of claim 8, wherein the incitation to produce executable code is an application module starting.

11. The non-transitory program storage device of claim 8, wherein an option indicator comprises an attribute including a conditional expression.

12. The non-transitory program storage device of claim 8, wherein the instructions stored thereon to further cause the one or more processors to:
query a data resource to discover variable or constant values required to generate the executable code.

13. The non-transitory program storage device of claim 8, wherein generating the executable code comprises comping the intermediate representation.

14. A system comprising:
one or more CPUs;
one or more Graphics Processing Units (GPUs);
a memory for storing program instructions for the one or more CPUs, where certain instructions when executed cause the one or more CPUs to:
generate an intermediate representation of a shader source code module, wherein the intermediate representation comprises intermediate code;

wherein the shader source code module comprises a plurality of option indicators, each option indicator indicating a place in the shader source code module corresponding to enabling or disabling one of a plurality of features embodied in the shader source code module, and wherein the intermediate representation comprises a compiled version of the shader source code module, which includes a compiled option indicator corresponding to each of the plurality of option indicators in the shader source code module;

receive an indication to produce executable code for the one or more GPUs, wherein the executable code includes a first plurality of features expressed el the shader source code module and the executable code does not include a second plurality of features expressed in the shader source code module; and generate the executable code from the intermediate representation.

15. The system of claim 14, wherein the indication to produce executable code is a runtime request for the executable code.

16. The system of claim 14, wherein the indication to produce executable code is an application module starting.

17. The system of claim 14, wherein an option indicator comprises an attribute including a conditional expression.

18. The system of claim 14, wherein the certain instructions when executed further cause the one or more CPUs to:
query a data resource to discover variable or constant values required to generate the executable code.

19. The system of claim 14, wherein generating the executable code comprises compiling the intermediate representation.

20. The system of claim 14, wherein the first plurality of features expressed in the shader source code comprises a plurality of properties that will be exercisable in the generated executable code.

* * * * *